United States Patent
Gao

(10) Patent No.: US 9,451,477 B2
(45) Date of Patent: Sep. 20, 2016

(54) METHOD AND SYSTEM FOR IMPLEMENTING DRIVE TEST

(75) Inventor: Yin Gao, Shenzhen (CN)

(73) Assignee: ZTE Corporation (CN)

( * ) Notice: Subject to any disclaimer, the term of this patent is extended or adjusted under 35 U.S.C. 154(b) by 305 days.

(21) Appl. No.: 13/882,003

(22) PCT Filed: Jun. 29, 2011

(86) PCT No.: PCT/CN2011/076554
§ 371 (c)(1),
(2), (4) Date: Jul. 8, 2013

(87) PCT Pub. No.: WO2012/055261
PCT Pub. Date: May 3, 2012

(65) Prior Publication Data
US 2013/0279357 A1  Oct. 24, 2013

(30) Foreign Application Priority Data

Oct. 29, 2010 (CN) .......................... 2010 1 0525142

(51) Int. Cl.
*H04W 24/02* (2009.01)
*H04W 24/10* (2009.01)
*H04W 24/08* (2009.01)

(52) U.S. Cl.
CPC ............. *H04W 24/02* (2013.01); *H04W 24/10* (2013.01); *H04W 24/08* (2013.01)

(58) Field of Classification Search
CPC ... H04W 24/08; H04W 24/10; H04W 24/02; H04W 8/22
See application file for complete search history.

(56) References Cited

U.S. PATENT DOCUMENTS

2011/0276838 A1* 11/2011 Zhou ..................... H04W 24/08 714/45
2011/0319115 A1* 12/2011 Racz .............................. 455/514

FOREIGN PATENT DOCUMENTS

CN          101282559        10/2008

OTHER PUBLICATIONS

International Search Report mailed Oct. 13, 2011 in PCT Application No. PCT/CN2011/076554.
CATT, Discussion on MDT configuration, R3-102225 [online], 3GPP TSG-RAN WG3 #69, Aug. 27, 2010 Retrieved from the Internet: URL:http://www.3gpp.org/ftp/tsg_ran/WG3_lu/TSGR3_69/Docs/R3-102225.zip section 2.
3GPP TS 37.320 V1.0.0 [online] 3GPP Sep. 22, 2010 Retrieved from the Internet: URL:http://www.3gpp.org/ftp/Specs/archive/37_series/37.320/37320-100.zip sections 3-5.1.

* cited by examiner

*Primary Examiner* — Thai Nguyen
(74) *Attorney, Agent, or Firm* — Plumsea Law Group, LLC

(57) ABSTRACT

A method and system for implementing a drive test are provided in the present document. The method includes: a mobility management entity sending activation message including measurement configuration information of Minimization of drive test (MDT) to a base station; after receiving the activation message, if determining that it is appropriate for a corresponding UE to perform a corresponding MDT measurement, the base station sending the measurement configuration information to the UE. With the present document, a MDT configuration information interaction between a core network and the base station can be effectively implemented in a communication system, which enables the base station to better select an appropriate UE according to local information and enables the base station to utilize measurement information reported by the UE to achieve an object of MDT, thereby reducing maintenance and operation costs of the current communication network and enhancing the network performance.

13 Claims, 4 Drawing Sheets

METHOD AND SYSTEM FOR IMPLEMENTING DRIVE TEST

TECHNICAL FIELD

The present document relates to a technique for implementing a drive test, and more specifically, the present document relates to a method and system for implementing the drive test in a communication system, especially with respect to a Long Term Evolution (LTE)/Long Term Evolution-Advanced (LTE-A) communication system.

BACKGROUND OF THE RELATED ART

In a communication system, in order to reduce costs of network construction and operation, areas required to be monitored and optimized are tested through manual works in a traditional drive test, based on an evolution of the next generation network, dependency on the traditional drive test is lessened, and more intelligent network optimization tools are necessary, thus a requirement of automatically collecting measurements of a terminal and minimizing a manual drive test is extremely beneficial. On the other hand, optimization can be performed automatically and a network operation can be understood comprehensively by using test results of a User Equipment (UE). Therefore, a technical research of Minimization of drive test (MDT) is put forward in the Long Term Evolution (LTE) system, and meanwhile the technique also can be applied in a Universal Mobile Telecommunications System (UMTS). An implementation way is based on a measurement control and reporting mechanism under an eNB, and after the measurement, the UE performs a report which mainly includes two types of report such as an immediate report in a connection state and a log report in an IDLE state and also can include a log report type in the connection state.

Currently, a measurement content of the MDT mainly includes the following types. 1) Periodical downlink pilot measurement: Le, a measurement in a wireless environment, such as CPICH RSCP, CPICH Ec/No, RSRP and RSRQ (only to a connection mode) are recorded periodically.

This measurement log corresponds to a user example of coverage optimization.

The operators realize that main measurements for the throughput which can be implemented by the Downlink (DL) coverage are a DL common pilot receiving level and a DL Signal to Interference Ratio (SIR) level. Configurations of the existing Radio Resource Management (RRM) measurement mainly depend on a measurement report and a periodical report of event triggering, however certain limitations also exist:

A. There is no accompanying location information, even though the operators can identify a cell through a DL coverage, the operators are still required to execute the drive test to determine problematic areas in the cell, since accurate location information can be detected by a low DL common pilot receiving level or a low SIR level, it cannot be obtained from the current RRM mechanism.

B. The existing RRM mechanism only permits the measurement report when the UE is connected to a specific cell and there is sufficient Uplink (UL) coverage for transmitting the measurement report. This will limit the measurements collected from the UE, and the UE cannot experience an RLF and sufficient UL coverage.

2) Signal quality of a Serving Cell becomes worse than a threshold: when a signal quality of a serving cell is worse than a configured threshold, wireless environment measurements such as CPICH RSCP, CPICH Ec/No, or TDD P-CCPCH RSCP and ISCP, RSRP and RSRQ (only to a connection mode) are recorded. A measurement log window is needed to collect information within a certain period of time after and before the event occurs.

The measurement log corresponds to the user example of coverage optimization.

If the operators are interested in a specific DL coverage problem, it is effective to adopt measurement logs corresponding to the interested problem. The operators can convert their criterions (e.g. outside the coverage) into thresholds in order to find the problematic areas. In order to be able to identify characteristics of the problem (e.g. occurring in a specific mobile scenario), a beneficial measurement log thereof provides the information.

3) Transmit power headroom becomes less than a threshold: when transmit power headroom of the UE becomes less than a configured threshold, the transmit power headroom and wireless environment measurements such as CPICH RSCP, CPICH Ec/No, or TDD P-CCPCH RSCP and ISCP, RSRP and RSRQ (only to a connection mode) are recorded, and this measurement log corresponds to the user example of coverage optimization.

By observing a level of a UL transmit power, the operators can detect link budgets which have not sufficient UL, and also can deduce a realizable UL throughput level in the network. Collecting such information can assist the operators to better adjust Cell individual Offset (CIO), thereby deciding a layout in a center cell of the network and adjusting antenna dip angles and so on.

4) Random access failure: when a random access failure occurs, detailed information about the random access and wireless environment measurements such as CPICH RSCP, CPICH Ec/No, or TDD P-CCPCH RSCP and ISCP, RSCP and RSRQ (only in a connection state) are recorded.

This measurement log corresponds to the user example of coverage optimization.

Reasons for the random access failure are such as an inaccurate transmit power setting or competition. The operators can collect information about the random access failure to analyze characteristics of the random access failure. DL wireless environment measurements such as CPICH RSCP, CPICH Ec/No, RSRP and RSRQ are also necessary, for the open-loop power control in a random access process depends on these characteristics. Collecting such information can assist the operators to better adjust random access parameters and to adjust antenna dip angles and so on.

5) Paging Channel failure: when the UE does not decode a Physical Control Channel (PCCH) in a paging channel during a continuous time to X2, detailed information of wireless environment, location information, time and cell identifier are recorded, even though the operators can decode a Physical Downlink Control Channel (PDCCH) in a paging moment.

This measurement log corresponds to a user example of common channel parameterization.

In the IDLE mode, with regard to the operators, whether the UE can be paged reliably is extremely important. If a user cannot be paged, it will exert a negative influence on the user experience (at least in a paging unit) and also have an influence on incomes of the operators (missing the opportunities for calling). In the current network, the drive test can be used for estimating a capability of the UE by receiving paging message in a cell coverage area. Since these actions will cause high costs, if the UE can record an occurrence time when the UE cannot decode the information on the paging channel and other related information, it is very beneficial.

6) Broadcast Channel failure: when the UE does not find a related DL common channel to obtain system message required for residing in a cell, message information, location information, time, cell identifier and frequency in a wireless environment are recorded. This measurement corresponds to user examples of the coverage and capacity optimization and the common channel parameterization.

7) Radio Link Failure report (RLF report): when an RLF occurs in the UE, the UE reports wireless measurements such as CPICH RSCP, CPICH Ec/No or TDD P-CCPCH and ISCP, RSRP and RSRQ. A measurement for the RLF Report corresponds to the user example of coverage optimization.

The RLF report can identify a plurality of problems coming from a coverage aspect. Therefore, in an actual network, a probability of detecting coverage holes through this measurement information is expected to be high, and certain problems normally related to a detection of the DL common channel are also caused by the coverage problem. The RLF report provides a method for solving basic DL coverage problems, specific measurements for the common channel parameterization can be concentrated on adjusting the common channel parameters.

Collecting such information can assist the operators to find the coverage problems in the specific areas, thus reducing the manual drive tests.

At present, with regard to MDT configuration information, contents are also different according to the two different types (i.e. an immediate report type and a log report type), including: an MDT application scope which can be represented as a cell list or a Tracking Area (TA) list, identifier information of UE (only used for tracking based on the UE in the UMTS), and a MDT measurement content; with regard to an immediate reporting mode, it is also required to include a report trigger event, a report interval and a report amount; and with regard to a log reporting mode, a log record interval and a log configuration duration are included.

Meanwhile, analogy can be performed between an MDT flow and a current signaling tracking flow, and there are two basic ways: one is an MDT flow based on management; and the other is an MDT flow based on signaling. For the latter, Operation Administration and Maintenance (OAM) will send the mar configuration information to a Home Subscriber Server (HSS), the HSS can select an appropriate UE, when the UE performs a location update through an ATTACH flow, a core network will send the MDT configuration information to the eNB through an S1 interface flow, the eNB can manage the MDT configuration information locally, meanwhile, since the eNB also knows more state information of the UE, such that the eNB can decide whether it is appropriate for the UE to perform corresponding MDT measurements currently according to certain local information in combination with the MDT configuration information sent by the core network, and if it is appropriate, the configuration information is sent to a corresponding UE through an air interface, and the UE will perform measurement report according to the MDT configuration information.

However, a scheme of how to perform an MDT configuration information interaction between the core network and the base station for implementing the drive test hasn't been proposed at present.

SUMMARY OF THE INVENTION

The technical problem required to be solved by the present document is to provide a method and system for implementing a drive test, to effectively implement an MDT configuration information interaction between a core network and a base station.

In order to solve the above technical problem, the present document provides a method for implementing a drive test, which comprises:

a mobility management entity sending activation message carrying measurement configuration information of MDT to a base station;

after receiving the activation message, if determining that it is appropriate for a corresponding User equipment (UE) to perform a corresponding MDT measurement, the base station sending the measurement configuration information to the UE.

The above method is further characterized in that: the measurement configuration information comprises: an MDI measurement type and an MDT measurement content.

The above method is further characterized in that: the MDT measurement type comprises one or two of following types: an immediate report type and a log report type;

if the MDT measurement type comprises the immediate report type, the measurement configuration information further comprises: a report trigger event, a report interval and a report amount;

if the MDT measurement type comprises the log report type, the measurement configuration information further comprises: a log record interval and a log configuration duration.

The above method is further characterized in that: the MDT measurement content comprises one or two of following contents: signal quality of a current serving cell and signal quality of an adjacent cell.

The above method is further characterized in that: before the step of the base station sending the measurement configuration information to the UE, the method further comprises:

the base station judging whether the base station itself supports an MDT measurement processing capacity, if yes, sending the measurement configuration information to the UE through air interface message; and if not, returning failure response message carrying a failure reason of not supporting MDT measurement configurations to the mobility management entity.

The above method is further characterized in that: the activation message comprises: signaling trace start message, initial context setup request message or handover request message.

The above method is further characterized in that: the activation message is request message for newly constructing an MDT measurement, and the measurement configuration information further comprises: a unique identifier for the UE and the mobility management entity on an interface S1 and a unique identifier for the UE and the base station on an interface S1.

The above method is further characterized in that: the measurement configuration information further comprises: art IP address of an MDT measurement collection entity.

In order to solve the above problem, the present document further provides a system for implementing a drive test, which comprises:

a mobility management entity, configured to send activation message carrying measurement configuration information of MDT to a base station;

the base station, configured to: after receiving the activation message, if determining that it is appropriate for a corresponding UE to perform a corresponding MDT measurement, send the measurement configuration information to the UE.

The above system is further characterized in that: the measurement configuration information comprises: an MDT measurement type and an MDT measurement content.

The above system is further characterized in that: the MDT measurement type comprises one or two of following types: an immediate report type and a log report type;

if the MDT measurement type comprises the immediate report type, the measurement configuration information further comprises: a report trigger event, a report interval and a report amount;

if the MDT measurement type comprises the log report type, the measurement configuration information further comprises: a log record interval and a log configuration duration.

The above system is further characterized in that: the MDT measurement content comprises one or two of following contents: signal quality of a current serving cell and signal quality of an adjacent cell.

The above system is further characterized in that: before sending the measurement configuration information to the UE, the base station is further configured to: judge whether the base station itself supports an MDT measurement processing capacity, if yes, send the measurement configuration information to the UE through air interface message; and if not, return failure response message carrying a failure reason of not supporting MDT measurement configurations to the mobility management entity.

The above system is further characterized in that:

the activation message comprises: signaling trace start message, initial context setup request message or handover request message.

The above system is further characterized in that:

the activation message is request message for newly constructing an MDT measurement, and the measurement configuration information further comprises: a unique identifier for the UE and the mobility management entity on an interface S1 and a unique identifier for the UE and the base station on an interface S1.

The present document provides a method for implementing a drive test, which comprises: a mobility management entity sending activation message carrying measurement configuration information of MDT to a base station;

after receiving the activation message, if determining that it is appropriate for a corresponding UE to perform a corresponding MDT measurement, the base station sending the measurement configuration information to the UE.

Wherein, the measurement configuration information comprises: an MDT measurement type and an MDT measurement content.

Wherein, the MDT measurement type comprises one or two of following types: an immediate report type and a log report type, wherein:

if the MDT measurement type comprises the immediate report type, the measurement configuration information further comprises: a report trigger event, a report interval and a report amount;

if the MDT measurement type comprises the log report type, the measurement configuration information further comprises: a log record interval and a log configuration duration.

Wherein, the MDT measurement contents comprise one or two of following contents: signal quality of a current serving cell and signal quality of an adjacent cell.

Wherein, before the step of the base station sending the measurement configuration information to the UE, the method further comprises:

the base station judging whether the base station itself supports an MDT measurement processing capacity, if yes, sending the measurement configuration information to the UE through air interface message; and if not, returning failure response message carrying a failure reason of not supporting MDT measurement configurations to the mobility management entity.

Wherein, the activation message comprises: signaling trace start message, initial context: setup request message or handover request message.

Wherein, the activation message is request message for newly constructing an MDT measurement, and the measurement configuration information further comprises: a unique identifier for the UE and the mobility management entity on an interface S1 and a unique identifier for the UE and the base station on an interface S1.

Wherein, the measurement configuration information further comprises: an IP address of a MDT measurement collection entity.

The present document provides a system for implementing a drive test, which comprises: a mobility management entity and a base station, wherein:

the mobility management entity is configured to: send activation message carrying measurement configuration information of MDT to the base station;

the base station is configured to: after receiving the activation message, if determining that it is appropriate for a corresponding UE to perform a corresponding MDT measurement, send the measurement configuration information to the UE.

Wherein, the measurement configuration information comprises: an MDT measurement type and an MDT measurement content.

Wherein, the MDT measurement type comprises one or two of following types: an immediate report type and a log report type, wherein:

if the MDT measurement type comprises the immediate report type, the measurement configuration information further comprises: a report trigger event, a report interval and a report amount;

if the MDT measurement type comprises the log report type, the measurement configuration information further comprises: a log record interval and a log configuration duration.

Wherein, the MDT measurement content comprises one or two of following contents: signal quality of a current serving cell and signal quality of an adjacent cell.

Wherein, the base station is further configured to: before sending the measurement configuration information to the UE, locally judge whether an MDT measurement processing capacity is supported, if yes, send the measurement configuration information to the UE through air interface message; and if not, return failure response message carrying a failure reason of not supporting MDT measurement configurations to the mobility management entity.

Wherein, the activation message comprises: signaling trace start message, initial context setup request message or handover request message.

Wherein, the activation message is request message for newly constructing an MDT measurement, and the measurement configuration information further comprises: a unique identifier for the UE and the mobility management entity on an interface S1 and a unique identifier for the LIE and the base station on an interface S1.

The present document provides a base station for implementing a drive test, comprising: a receiver, a storage and a processor, wherein:

the receiver is configure to receive activation message carrying measurement configuration information of Minimization of drive test (MDT);

the storage is configured to store information of a User Equipment (UE);

the processor is configure to determine whether the UE is appropriate for to perform a corresponding MDT measurement of the activation message, and if yes, send the measurement configuration information to the UE.

Wherein, the measurement configuration information comprises: an MDT measurement type and an MDT measurement content.

Wherein, the MDT measurement type comprises one or two of following types: an immediate report type and a log report type, wherein:

if the MDT measurement type comprises the immediate report type, the measurement configuration information further comprises: a report trigger event, a report interval and a report amount;

if the MDT measurement type comprises the log report type, the measurement configuration information further comprises: a log record interval and a log configuration duration.

Wherein, the MDT measurement content comprise one or two of following contents: signal quality of a current serving cell and signal quality of an adjacent cell.

Wherein, the processor is further configured to: before sending the measurement configuration information to the UE, locally judge whether an MDT measurement processing capacity is supported, if yes, send the measurement configuration information to the UE through air interface message; and if not, return failure response message carrying a failure reason of not supporting MDT measurement configurations to the mobility management entity.

Wherein, the activation message comprises: signaling trace start message, initial context setup request message or handover request message.

Wherein, the activation message is request message for newly constructing an MDT measurement, and the measurement configuration information further comprises: a unique identifier for the UE and the mobility management entity on an interface S1 and a unique identifier for the UE and the base station on an interface S1.

In conclusion, the present document provides a method and system for implementing the drive test so as to effectively implement an MDT configuration information interaction between the core network and the base station in a communication system, which enables the eNB to better select an appropriate UE according to local information and enables the base station to utilize measurement information reported by the UE to achieve an object of MDT, thereby reducing maintenance and operation costs of the current communication network and enhancing the network performance.

PREFERRED EMBODIMENTS OF THE INVENTION

In order to better understand the present document, the present document will be further described in combination with the accompanying drawings and specific examples below.

Figure 1:
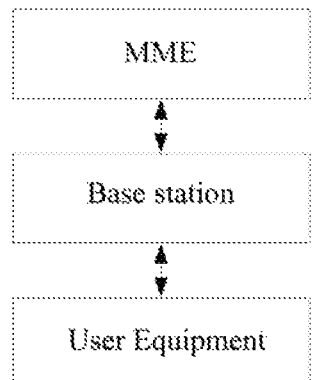
FIG. 1 is a schematic diagram of a system for implementing a drive test according to the example of the present document.

FIG. 1 is a schematic diagram of a system for implementing a drive test according to the example of the present document, and as shown in FIG. 1, the system includes a Mobility Management Entity (MME) and a base station (i.e. an eNB), wherein:

the MME is configured to: according to requirements of a network management, send activation message carrying measurement configuration information of MDT to the base station;

the base station is configured to: after receiving the activation message, if determining that it is appropriate for a corresponding UE to perform a corresponding MDT measurement, send the measurement configuration information to the UE.

Wherein, the measurement configuration information can include: an MDT measurement type and an MDT measurement content.

The MDT measurement type can include: an immediate report type and/or a log report type;

if the MDT measurement type includes the immediate report type, the measurement configuration information also includes: a report trigger event, a report interval and a report amount;

if the MDT measurement type includes the log report type, the measurement configuration information also includes: a log record interval and a log configuration duration.

The MDT measurement contents can include: signal quality of a current serving cell and/or signal quality of an adjacent cell.

The activation message can include: signaling trace start message, initial context setup request message, handover request message, or request message for newly constructing an MDT measurement.

Figure 2:
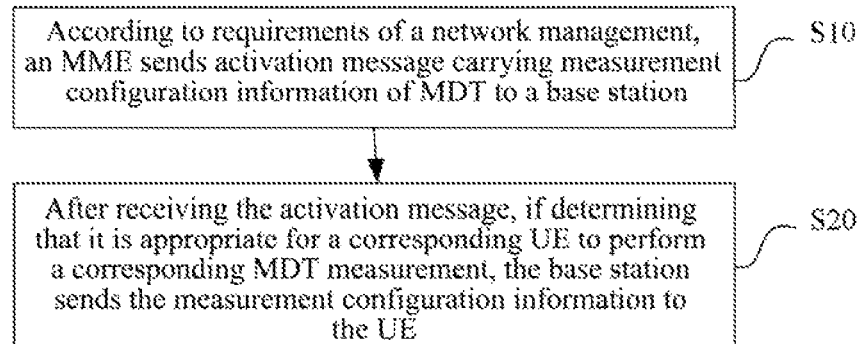
FIG. 2 is a flow diagram of a method for implementing a drive test according to the example of the present document.

FIG. 2 is a flow diagram of a method for implementing a drive test according to the example of the present document, and as shown in FIG. 2, steps S10-S20 are included.

In step S10, according to requirements of a network management, an MME sends activation message carrying measurement configuration information of MDT to a base station.

In step S20, after receiving the activation message, if determining that it is appropriate for a corresponding UE to perform a corresponding MDT measurement, the base station sends the measurement configuration information to the UE.

Wherein, the measurement configuration information includes: an MDT measurement type and an MDT measurement content.

Therefore, an MDT configuration information interaction between a core network and a base station can be implemented in the present document.

The method for implementing the drive test according to the present document will be described in detail through a plurality of specific examples below.

Example 1

Figure 3:
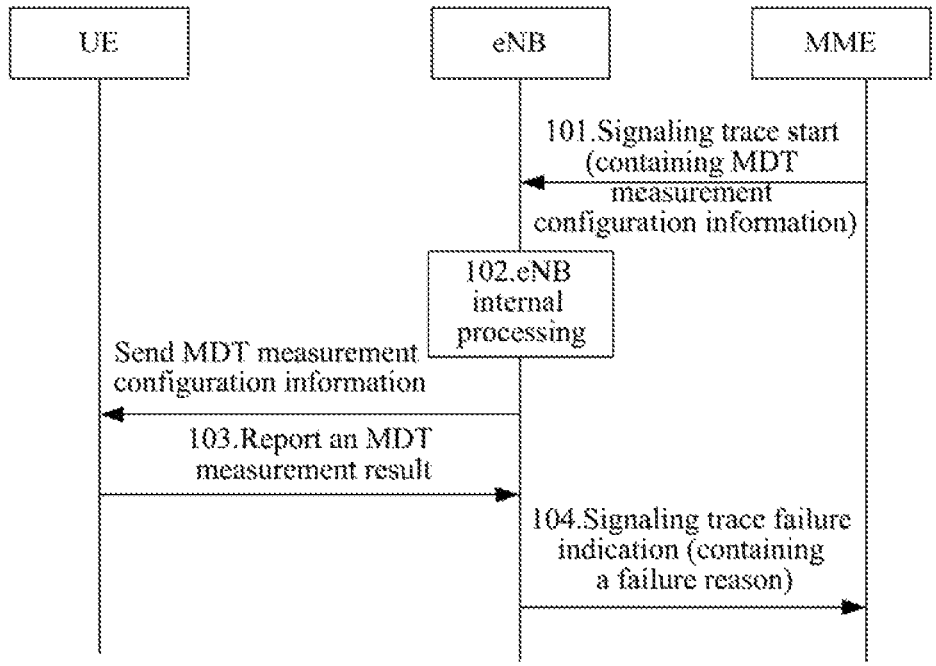
FIG. 3 is a flow diagram of a method for implementing a drive test according to the example 1 of the present document.

FIG. 3 is a flow diagram of a method for implementing a drive test according to the example 1 of the present document, and as shown in FIG. 3, steps 101-104 are included.

In step 101, an MME sends measurement configurations of the drive test to an eNB through a Control Plane (CP) according to requirements of a network management, and it is implemented by sending signaling trace start (TRACE START) message, the message includes MDT measurement configuration information, and the MDT measurement configuration information contains one or more kinds of combinations of the following information:

an MDT measurement type, including: an immediate report type and/or a log report type;

an MDT measurement content, including: signal quality of a current serving cell and/or signal quality of an adjacent cell and so on.

With regard to the immediate report type, it also needs to include a report trigger event, a report interval and a report amount. With regard to the log report type, it needs to include a log record interval and a log configuration duration.

In step 102, after receiving the above MDT configuration information, according to the locally stored information of the UE, such as information including a capability of the current UE, a service attribute and a mobility state of the UE and so on, the eNB decides whether it is appropriate for the UE to perform the MDT measurement distributed by the MME, for example, the eNB can select a UE with less service data amount currently to perform a log measurement, and meanwhile, it is also required to consider whether the eNB itself supports an MDT measurement processing capacity, if the MDT measurement processing capacity is supported, a current MDT measurement configuration is accepted, and then the eNB sends the MDT measurement configuration information to the UE through air interface message, and proceeds to step 103, otherwise proceeds to step 104.

In step 103, the UE reports drive test results to the eNB through a control plane signaling, and then the eNB can send the collected information of drive test results to the network management or the eNB performs local processing.

In step 104, the eNB returns signaling trace failure indication (TRACE FAILURE INDICATION) message to the MME, wherein a failure reason is contained, and the failure reason can be extended as not supporting the MDT measurement configurations.

Example 2

Figure 4:
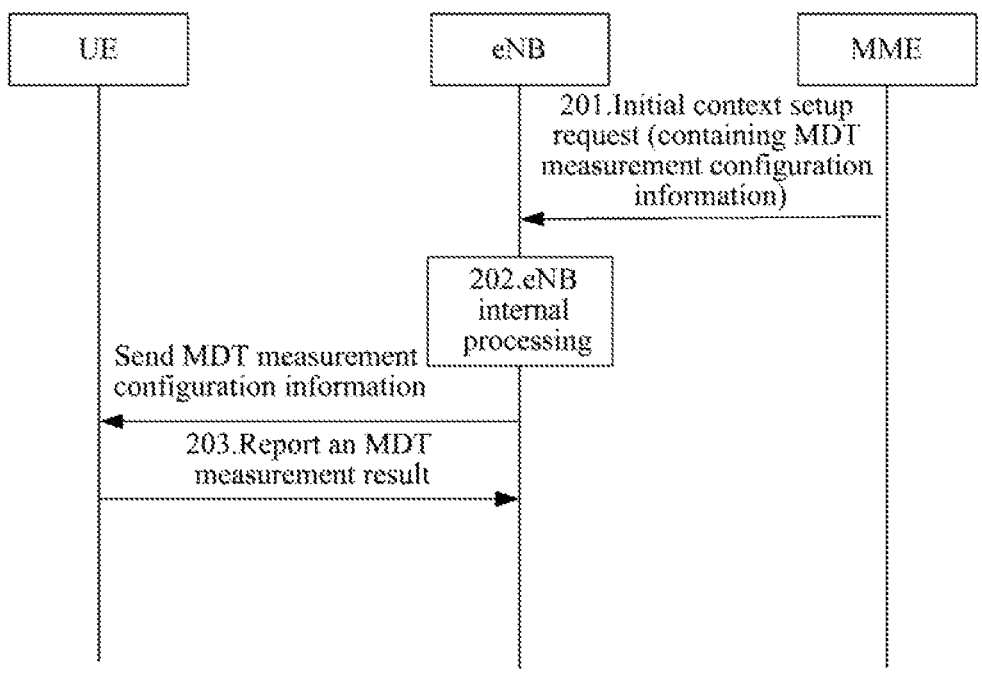
FIG. 4 is a flow diagram of a method for implementing a drive test according to the example 2 of the present document.

FIG. 4 is a flow diagram of a method for implementing a drive test according to the example 2 of the present document, and as shown in FIG. 4, steps 201-203 are included.

In step 201, an MME sends measurement configurations of the drive test to an eNB through a CP according to requirements of a network management, which is implemented by sending initial context setup request (INITIAL CONTEXT SETUP REQUEST) message, the message includes MDT measurement configuration information, and the MDT measurement configuration information contains one or more kinds of combinations of the following information:

a MDT measurement including: an immediate report type and/or a log report type;

a MDT measurement content, including: signal quality of a current serving cell and/or signal quality of an adjacent cell and so on.

With regard to the immediate report type, it also needs to include a report trigger event, a report interval and a report amount; and with regard to the log report type, it includes a log record interval and a log configuration duration.

In step 202, after receiving the above MDT configuration information, according to the locally stored information of the UE, such as information including a current capability of the current UE, a service attribute and a mobility state of the UE and so on, the eNB decides whether it is appropriate for the UE to perform the MDT measurement distributed by the MME, for example, the eNB can select a UE with less service data amount currently to perform a log measurement, and meanwhile, it is also required to consider whether the eNB itself supports an MDT measurement processing capacity, if the MDT measurement processing capacity is supported, a current MDT measurement configuration is accepted, and then the eNB sends the MDT measurement configuration information to the UE through air interface message, and proceeds to step 203, otherwise performs no processing.

In step 203, the UE reports drive test results to the eNB through a control plane signaling, and then the eNB can send the collected information of drive test results to the network management or the eNB performs local processing.

Example 3

Figure 5:
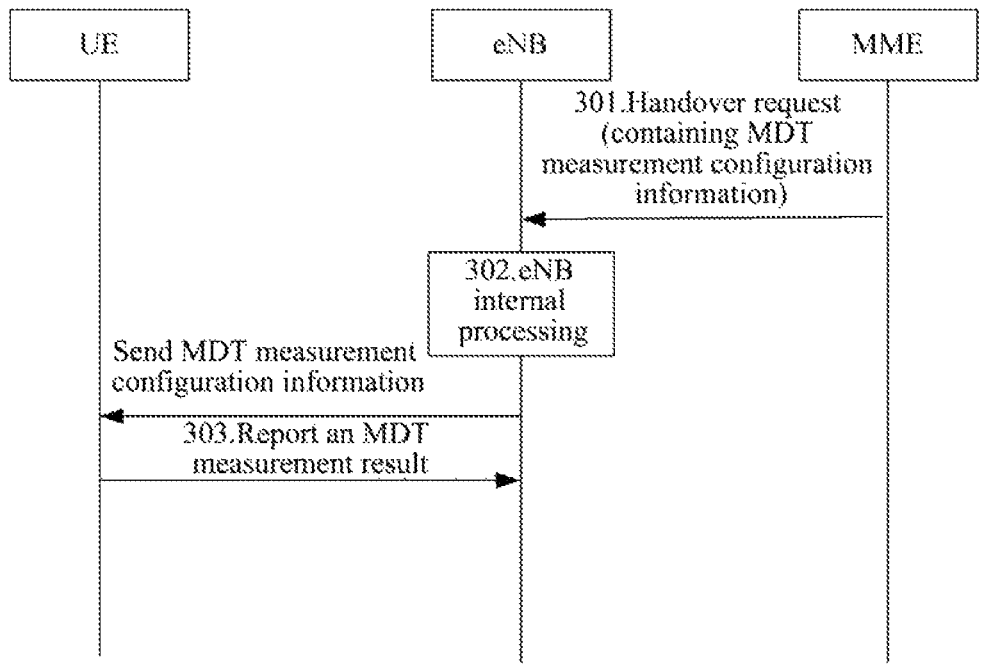
FIG. 5 is a flow diagram of a method for implementing a drive test according to the example 3 of the present document.

FIG. 5 is a flow diagram of a method for implementing a drive test according to the example 3 of the present document, and as shown in FIG. 5, steps 301-303 are included.

In step 301, when a UE is in a handover process, an MME can send handover request (HANDOVER REQUEST) message, the message includes MDT measurement configuration information, and the MDT measurement configuration information contains one or more kinds of combinations of the following information:

an MDT measurement type, including: an immediate report type and/or a log report type;

an MDT measurement content, including: signal quality of a current serving cell and/or signal quality of an adjacent cell and so on.

With regard to the immediate report type, it also needs to include a report trigger event, a report interval and a report amount. With regard to the log report type, it includes a log record interval and a log configuration duration.

In step 302, after receiving the above MDT configuration information, according to the locally stored information of the UE, such as information including a capability of the current UE, a service attribute and a mobility state of UE and so on, a target eNB decides whether it is appropriate for the UE to perform the MDT measurement distributed by the MME, for example, the eNB can select a UE with less service data amount currently to perform a log measurement, and meanwhile, it is also required to consider whether the eNB itself supports an MDT measurement processing capacity, if the MDT measurement processing capacity is supported, a current MDT measurement configuration is accepted, and the eNB sends the measurement configuration information to the UE through air interface message, and proceeds to step 303, otherwise performs no processing.

In step 303, the UE reports drive test results to the eNB through a control plane signaling, and then the eNB can send the collected information of drive test results to a network management or the eNB performs local processing.

Example 4

Figure 6:
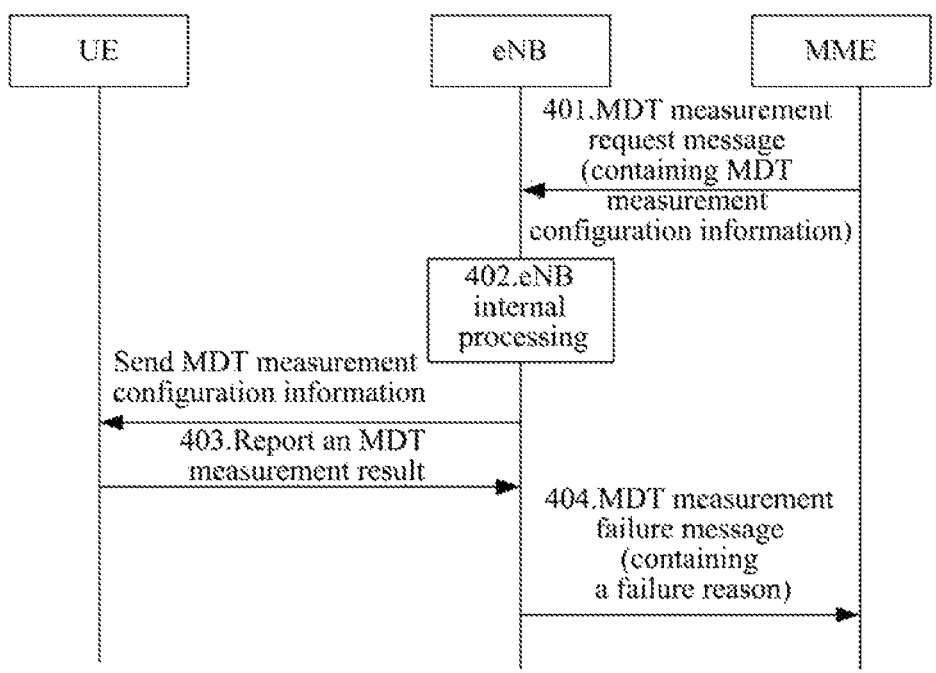
FIG. 6 is a flow diagram of a method for implementing a drive test according to the example 4 of the present document.

FIG. 6 is a flow diagram of a method for implementing a drive test according to the example 4 of the present document, and as shown in FIG. 6, steps 401-404 are included.

In step 401, an MME sends measurement configurations of the drive test to an eNB through a CP according to requirements of a network management, which is implemented by constructing MDT measurement request message, the MDT measurement request message carries MDT measurement configuration information, and the MDT measurement configuration information includes the following contents:

a unique identifier for the UE and the MME on an interface S1 and a unique identifier for the UE and the eNB on an interface S1;

the MDT configuration information contains one or more kinds of combinations of the following information:

an MDT measurement type, including: an immediate report type and/or a log report type;

an MDT measurement content, including: signal quality of a current serving cell and/or signal quality of an adjacent cell and so on.

With regard to the immediate reporting mode, the MDT measurement configuration information also needs to include a report trigger event, a report interval and a report amount. With regard to the log reporting mode, the MDT measurement configuration information includes a log record interval and a log configuration duration.

Alternatively, the MDT measurement configuration information can also include an IP address of an MDT measurement collection entity, such as an LP address of a signaling Trace Collection Entity (TCE).

In step 402, after receiving the above MDT configuration information, according to the locally stored information of the UE, such as information including a capability of the current UE, a service attribute and a mobility state of UE and so on, the eNB decides whether it is appropriate for the UE to perform the MDT measurement distributed by the MME, for example, the eNB can select a UE with less service data amount currently to perform a log measurement, and meanwhile, it is also required to consider whether the eNB itself supports an MDT measurement processing capacity, if the MDT measurement processing capacity is supported, a current MDT measurement configuration is accepted, and then the eNB sends the measurement configuration information to the UE through air interface message, and proceeds to step 403, otherwise proceeds to step 404.

In step 403, the UE reports drive test results to the eNB through a control plane signaling, and then the eNB can send the collected information of drive test results to the network management or the eNB performs local processing.

In step 404, the eNB returns MDT measurement failure message to the MME, wherein a failure reason is contained, and the failure reason can be set as not supporting the MDT measurement configurations.

Figure 7:
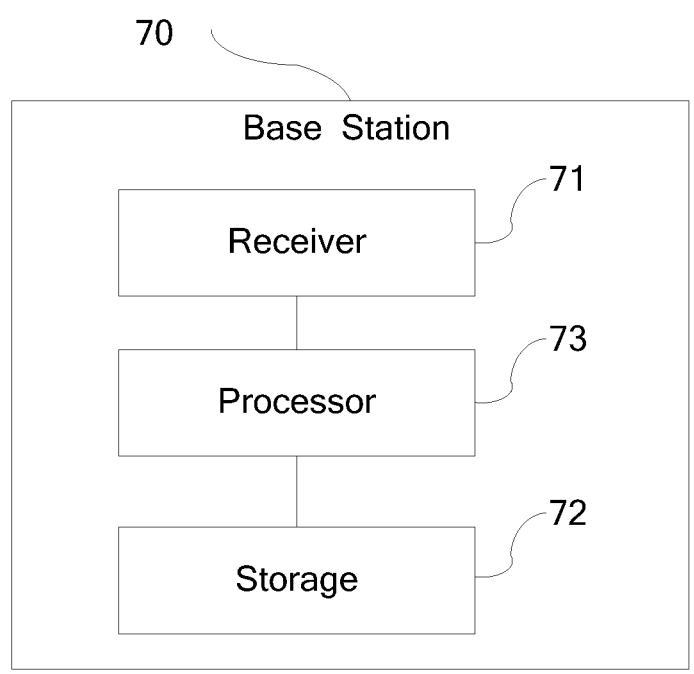
FIG. 7 is a schematic diagram of a base station for implementing a drive test according to the example of the present document.

As shown in FIG. 7, the present document provides a base station 70 for implementing a drive test, comprising: a receiver 71, a storage 72 and a processor 73, wherein:

the receiver 71 is configure to receive activation message carrying measurement configuration information of Minimization of drive test (MDT);

the storage 72 is configured to store information of a User Equipment (UE); and the processor 73 is configure to determine whether the UE is appropriate for to perform a corresponding MDT measurement of the activation message based on the activation message and stored the information of the UE, and if yes, send the measurement configuration information to the UE.

Wherein, the measurement configuration information comprises: an MDT measurement type and an MDT measurement content.

Wherein, the MDT measurement type comprises one or two of following types: an immediate report type and a log report type, wherein:

if the MDT measurement type comprises the immediate report type, the measurement configuration information further comprises: a report trigger event, a report interval and a report amount;

if the MDT measurement type comprises the log report type, the measurement configuration information further comprises: a log record interval and a log configuration duration.

Wherein, the MDT measurement content comprise one or two of following contents: signal quality of a current serving cell and signal quality of an adjacent cell.

Wherein, the processor 73 is further configured to: before sending the measurement configuration information to the UE, locally judge whether an MDT measurement processing capacity is supported, if yes, send the measurement configuration information to the UE through air interface message; and if not, return failure response message carrying a failure reason of not supporting MDT measurement configurations to the mobility management entity.

Wherein, the activation message comprises: signaling trace start message, initial context setup request message or handover request message.

Wherein, the activation message is request message for newly constructing an MDT measurement, and the measurement configuration information further comprises: a unique identifier for the UE and the mobility management entity on an interface S1 and a unique identifier for the UE and the base station on an interface S1.

The ordinary person skilled in the art can understand that all or part of the steps in the above method can be completed by a program instructing related hardware, and the program can be stored in a computer readable memory medium, such as a read-only memory, disk or optical disk and so on. Alternatively, all or part of the steps of the above examples also can be implemented by using one or multiple integrated circuits. Correspondingly, each module/unit in the above examples can be implemented in a form of hardware, and also can be implemented in a form of software function module. The present document is not limited to any combination of hardware and software in a specific form.

The above description is only the preferred examples of the present document. Certainly, the present document can still have other various examples. The skilled familiar to the art can make various corresponding changes and transformations according to the present document without departing from the spirit and essence of the present document, and these corresponding changes and transformations shall all fall into the protection scope of the appended claims of the present document.

INDUSTRIAL APPLICABILITY

With a method and system for implementing the drive test provided by the present document, an MDT configuration information interaction between the core network and the base station is effectively implemented in a communication system, which enables the eNB to better select an appropriate UE according to local information and enables the base station to utilize measurement information reported by the UE to achieve an object of MDT, thereby reducing maintenance and operation costs of the current communication network and enhancing the network performance. Therefore, it has an extremely strong industrial applicability.

What is claimed is:

1. A method for implementing a drive test, comprising:
a mobility management entity sending activation message carrying measurement configuration information of Minimization of drive test (MDT) to a base station, wherein the measurement configuration information comprises an MDT measurement type and an MDT measurement content but without an identification of a specific User Equipment (UE) for MDT measurement;
after receiving the activation message, the base station determining whether a UE is appropriate to perform a corresponding MDT measurement, and if yes, the base station sending the measurement configuration information from the mobility management entity to the UE, so that the UE performs the MDT measurement based on the measurement configuration information;
wherein the activation message comprises: a handover request message; and
wherein: the MDT measurement type comprises one or two of the following types: an immediate report type and a log report type, wherein:
   if the MDT measurement type comprises the immediate report type, the measurement configuration information further comprises: a report trigger event, a report interval and a report amount; and
   if the MDT measurement type comprises the log report type, the measurement configuration information further comprises: a log record interval and a log configuration duration.

2. The method according to claim 1, wherein: the MDT measurement content comprises one or two of following contents: signal quality of a current serving cell and signal quality of an adjacent cell.

3. The method according to claim 1, wherein: before the step of the base station sending the measurement configuration information to the UE, the method further comprises:
the base station locally judging whether an MDT measurement processing capacity is supported, if yes, sending the measurement configuration information to the UE through air interface message; and if not, returning failure response message carrying a failure reason of not supporting MDT measurement configurations to the mobility management entity.

4. The method according to claim 1, wherein: the activation message is a request message for newly constructing an MDT measurement, and the measurement configuration information further comprises: a unique identifier for the UE and the mobility management entity on an interface S1 and a unique identifier for the UE and the base station on an interface S1.

5. The method according to claim 4, wherein: the measurement configuration information further comprises: an IP address of an MDT measurement collection entity.

6. A system for implementing a drive test, comprising:
a mobility management entity and a base station, wherein:
   the mobility management entity comprises a transceiver which is configured to: send activation message carrying measurement configuration information of Minimization of drive test (MDT) to the base station, wherein the measurement configuration information comprises an MDT measurement type and an MDT measurement content but without an identification of a specific User Equipment (UE) for MDT measurement;
   the base station comprises a transceiver and a processor, wherein
      the transceiver is configured to: receive the activation message from the mobility management entity, wherein the activation message comprises: an initial context setup request message or a handover request message; and
      the processor is configured to: after the transceiver has received the activation message, determine whether a UE is appropriate to perform a corresponding MDT measurement, and if yes, send the measurement configuration information from the mobility management entity to the UE, so that the UE performs the MDT measurement based on the measurement configuration information;
   wherein: the MDT measurement type comprises one or two of the following types: an immediate report type and a log report type, wherein:
      if the MDT measurement type comprises the immediate report type, the measurement configuration information further comprises: a report trigger event, a report interval and a report amount; and
      if the MDT measurement type comprises the log report type, the measurement configuration information further comprises: a log record interval and a log configuration duration.

7. The system according to claim 6, wherein: the MDT measurement content comprises one or two of following contents: signal quality of a current serving cell and signal quality of an adjacent cell.

8. The system according to claim 6, wherein: the base station is further configured to: before sending the measurement configuration information to the UE, locally judge whether an MDT measurement processing capacity is supported, if yes, send the measurement configuration information to the UE through air interface message; and if not, return failure response message carrying a failure reason of not supporting MDT measurement configurations to the mobility management entity.

9. The system according to claim 6, wherein: the activation message is request message for newly constructing an MDT measurement, and the measurement configuration information further comprises: a unique identifier for the UE and the mobility management entity on an interface S1 and a unique identifier for the UE and the base station on an interface S1.

10. A base station for implementing a drive test, comprising: a receiver, a storage and a processor, wherein:

the receiver is configured to receive activation message carrying measurement configuration information of Minimization of drive test (MDT) from a mobility management entity, wherein the measurement configuration information comprises an MDT measurement type and an MDT measurement content but without an identification of a specific User Equipment (UE) for MDT measurement, and the activation message comprises initial context setup request message or handover request message;

the storage is configured to store information of a User Equipment (UE);

the processor is configured to determine whether the UE is appropriate for to perform a corresponding MDT measurement of the activation message based on the activation message and stored the information of the UE, and if yes, send the measurement configuration information from the mobility management entity to the UE, so that the UE performs the MDT measurement based on the measurement configuration information;

wherein: the MDT measurement type comprises one or two of the following types: an immediate report type and a log report type, wherein:

if the MDT measurement type comprises the immediate report type, the measurement configuration information further comprises: a report trigger event, a report interval and a report amount; and if the MDT measurement type comprises the log report type, the measurement configuration information further comprises: a log record interval and a log configuration duration.

11. The base station according to claim 10, wherein: the MDT measurement content comprises one or two of following contents: signal quality of a current serving cell and signal quality of an adjacent cell.

12. The base station according to 10, wherein: the processor is further configured to: before sending the measurement configuration information to the UE, locally judge whether an MDT measurement processing capacity is supported, if yes, send the measurement configuration information to the UE through air interface message; and if not, return failure response message carrying a failure reason of not supporting MDT measurement configurations to the mobility management entity.

13. The base station according to claim 10, wherein: the activation message is request message for newly constructing an MDT measurement, and the measurement configuration information further comprises: a unique identifier for the UE and the mobility management entity on an interface S1 and a unique identifier for the UE and the base station on an interface S1.

* * * * *